(12) United States Patent
Goulette et al.

(10) Patent No.: US 8,209,969 B2
(45) Date of Patent: Jul. 3, 2012

(54) METHOD AND APPARATUS FOR BURNING REFORMATE IN AN ENGINE EXHAUST STREAM

(75) Inventors: David A. Goulette, Marine City, MI (US); Kevin S. Hoyer, Grand Blanc, MI (US); Giulio A. Ricci-Ottati, Burton, MI (US); Daniel B. Hamilton, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 1272 days.

(21) Appl. No.: 11/453,352

(22) Filed: Jun. 15, 2006

(65) Prior Publication Data

US 2007/0289296 A1    Dec. 20, 2007

(51) Int. Cl.
*F01N 3/10* (2006.01)
(52) U.S. Cl. ............... 60/303; 60/274; 60/286; 60/288; 60/300; 431/5; 431/248; 431/350
(58) Field of Classification Search .............. 431/5, 158, 431/248, 350, 352; 60/274, 286, 288, 300, 60/303, 324, 272
See application file for complete search history.

(56) References Cited

U.S. PATENT DOCUMENTS

| | | | | | |
|---|---|---|---|---|---|
| 4,615,173 | A | * | 10/1986 | Usui et al. ...................... | 60/286 |
| 4,711,087 | A | * | 12/1987 | Kawamura ....................... | 60/286 |
| 5,014,509 | A | * | 5/1991 | Broering et al. ................ | 60/274 |
| 5,052,178 | A | * | 10/1991 | Clerc et al. ...................... | 60/274 |
| 5,570,576 | A | * | 11/1996 | Ament et al. ................... | 60/300 |
| 5,771,683 | A | * | 6/1998 | Webb ............................... | 60/274 |
| 5,826,428 | A | * | 10/1998 | Blaschke ......................... | 60/303 |

* cited by examiner

*Primary Examiner* — Binh Q Tran
(74) *Attorney, Agent, or Firm* — Thomas N. Twomey

(57) ABSTRACT

A burner module for burning injected reformate mixed with engine exhaust in an exhaust pipe ahead of aftertreatment devices, comprising an exhaust flow divider that creates a localized region of exhaust flow for mixture of the reformate. The amount of reformate required to produce a burnable composition in the localized area is less than what is required in the prior art to provide the same composition over the entire cross-sectional region of the exhaust pipe. An igniter is provided within the localized region. Upon ignition of the reformate, the flow of reformate may be increased to the point of a stoichiometric mixture for the entire exhaust, to produce the maximum heat for warm up. The exhaust flow divider may comprise a divider tube mounted in the exhaust pipe or may be simply a protrusion from a wall of the exhaust pipe.

18 Claims, 2 Drawing Sheets

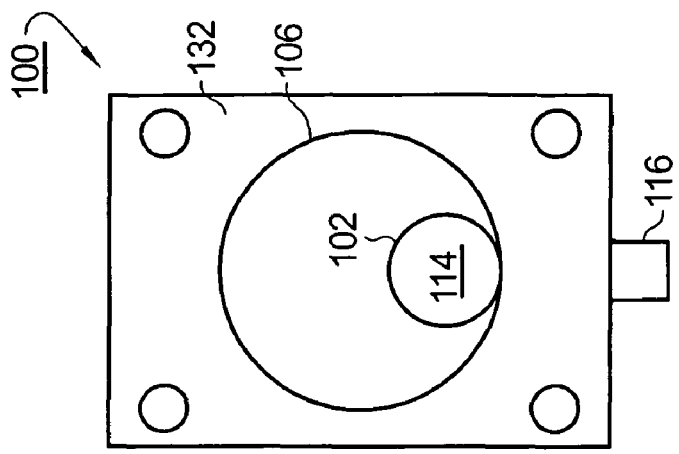
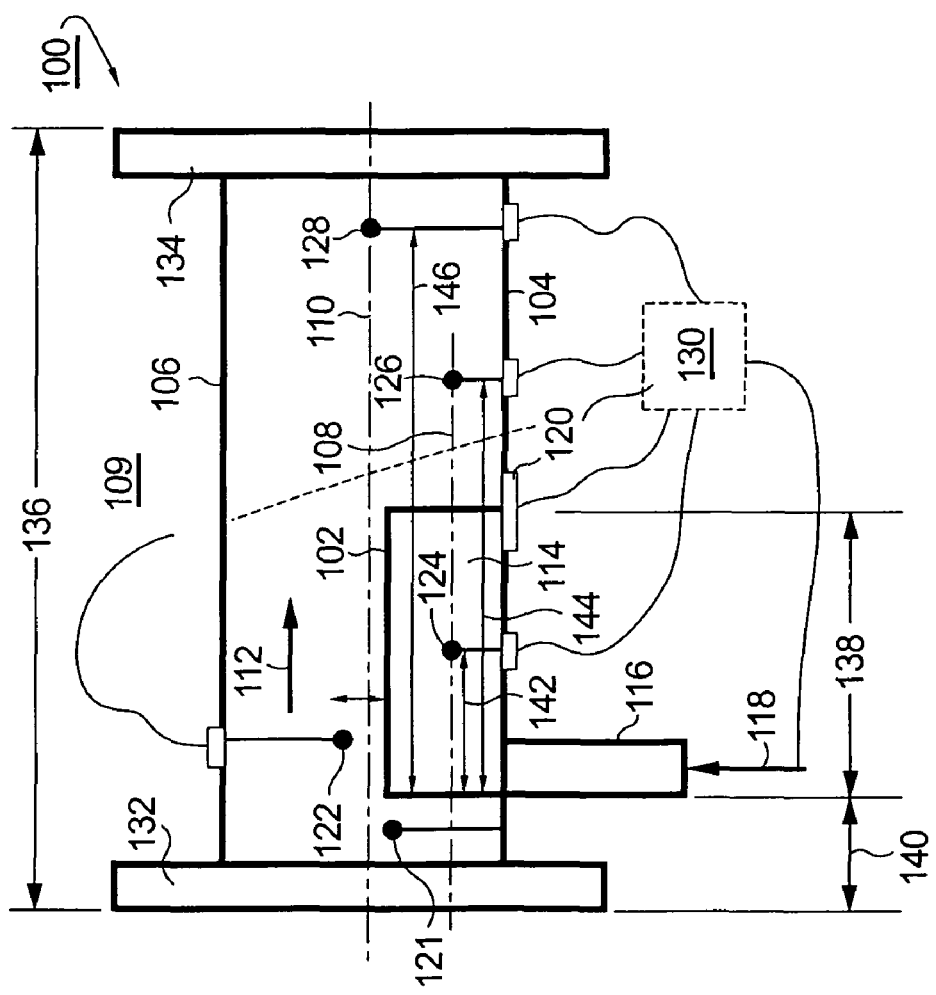
FIG. 2.
FIG. 1.

METHOD AND APPARATUS FOR BURNING REFORMATE IN AN ENGINE EXHAUST STREAM

TECHNICAL FIELD

The present invention relates to internal combustion engines; more particularly, to devices for aftertreatment of engine exhaust streams; and most particularly, to a method and apparatus for reliably and efficiently initiating and burning hydrocarbon reformate in an engine exhaust stream, especially a diesel engine exhaust stream.

BACKGROUND OF THE INVENTION

Governmental regulations on various polluting emissions from diesel engine sources have given rise to the use of aftertreatment devices in the exhaust systems of new engines. Several such devices are well known in the art, including but not limited to particulate filters, oxidation catalysts, and nitrogen oxides adsorbers. Due to the nature of diesel engines in general, the temperature of the exhaust tends to be relatively low, especially in comparison to the exhaust temperatures of spark-ignited engines. Unfortunately, the natural exhaust temperatures of diesel engines are not well matched to the optimal operating temperatures of known aftertreatment devices. Further, during a cold engine start the aftertreatment devices are generally non-active, resulting in the discharge of non-treated exhaust gases for some period of time until the engine warms up. Even after warm-up, during some periods such as idle conditions or under low load, the exhaust temperature may again be too low for the aftertreatment devices to function properly.

Various approaches are known in the prior art for increasing the temperature of diesel exhaust gases, including post-injection of fuel in the cylinders to create an exotherm; injection of diesel fuel and air into burners in exhaust systems; electrically heated catalysts; and injection of reformed diesel fuel (reformate) into the exhaust. Each of these prior art approaches has drawbacks.

Post-injection of fuel into the cylinders has had some success in raising exhaust gas temperature in combination with an oxidation catalyst, but this approach has limitations on cold start due to a higher light off temperature of the catalyst. Also, fuel consumption can be excessive due to combustion of fuel in the cylinders, reducing the amount of hydrocarbons reaching the exhaust system to participate in the exotherm. Another drawback is the potential for wetting of the cylinder walls with fuel which can reach the crankcase and cause dilution of the engine oil supply, leading to engine wear.

Injection of diesel fuel directly into the exhaust system can be effective in heating but requires complex ignition and control systems for both fuel and air, as well as additional hardware causing increasing weight and cost of the overall engine.

Electrically heated catalyst systems require large amounts of electrical energy which are parasitic on the engine and thus reduce fuel efficiency. Further, the amount of energy and fuel consumed increases in proportion to the size of the engine.

Burning a gaseous, hydrogen-rich fuel such as reformate directly in the exhaust is a very effective means of heat transfer to the aftertreatment devices located downstream of the reformate ignition point. However, in order to get the maximum amount of heat out of the reformate, such burning should take place at about stoichiometric equivalence with oxygen. Because diesel engines have large displacements, and because exhaust flow rates above idle can be quite substantial and typically are oxygen-rich, a high flow rate of reformate may be required to produce a combustible (let alone stoichiometric) mixture of reformate and oxygen. The resulting combustion may produce heat far in excess of that required to maintain the aftertreatment devices at optimum operating temperatures.

What is needed in the art is a method and apparatus for minimizing the amount of reformate fuel required in a diesel exhaust stream to provide adequate heating for exhaust gas remediation devices.

It is a principal object of the present invention to provide supplementary heat for aftertreatment devices in a diesel exhaust stream.

It is a further object of the invention to provide such supplementary heat while minimizing the amount of fuel required to do so.

SUMMARY OF THE INVENTION

Briefly described, the invention includes an in-exhaust burner comprising an exhaust flow divider within an engine exhaust pipe ahead of aftertreatment devices, which divider creates a localized area of the exhaust pipe for combustion of a reformate stream introduced into the burner. The flow amount of reformate to the localized area required to produce a burnable combustion composition is very much less than what is required in the prior art to provide the same composition over the entire cross-sectional area of the exhaust pipe. The composition is ignited by an igniter provided within the localized area. Upon ignition of the reformate, the flow of reformate may be increased, as may be desired, to the point of a stoichiometric mixture for the entire exhaust, to produce the maximum heat for warm up. The flame created from the localized burnable mixture ignites and continues to burn the added reformate, creating the heat required for the aftertreatment devices.

In a first embodiment, the exhaust flow divider is a tube mounted on a wall of the exhaust pipe. Preferably, the tube is open at both ends and is oriented longitudinally parallel to the direction of exhaust gas flow. The tube thus inherently selects a portion of the total exhaust gas flow that is proportional to the percentage of the cross-sectional area of the exhaust pipe occupied by the exhaust divider tube. Into the localized area of the tube is injected a metered flow of reformate from an associated hydrocarbon reformer mounted outside the exhaust pipe. An igniter within the tube ignites the combustive mixture of reformate and oxygen in the engine exhaust stream. An engine control module (ECM) monitors the temperature of the aftertreatment devices and the temperature of the exhaust stream and engages the reformate burner as necessary to maintain predetermined correct operating temperatures.

In a second embodiment, the exhaust flow divider comprises an inward protrusion from the wall of the pipe. The igniter and reformate introduction port are positioned within a localized area in the lee of the protrusion such that a combustible mixture is achieved before the reformate reaches the main flow of exhaust gas and becomes too diluted to support combustion.

BRIEF DESCRIPTION OF THE DRAWINGS

The present invention will now be described, by way of example, with reference to the accompanying drawings, in which:

FIG. 1 is an elevational cross-sectional view of a first embodiment of a reformate exhaust burner module in accordance with the invention;

FIG. 2 is an end view of the reformate exhaust burner module shown in FIG. 1;

Corresponding reference characters indicate corresponding parts throughout the several views. The exemplifications set out herein illustrates currently preferred embodiments of the invention, and such exemplification is not to be construed as limiting the scope of the invention in any manner.

DESCRIPTION OF THE PREFERRED EMBODIMENTS

Figure 4:
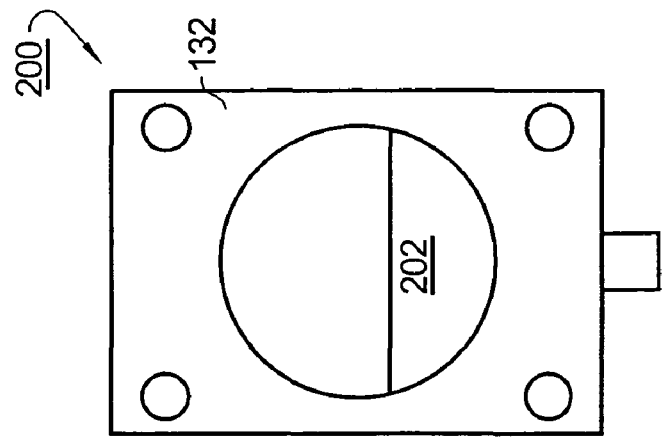
FIG. 4 is an end view of the reformate exhaust burner module shown in FIG. 3.

Referring to FIGS. 1 and 2, a first embodiment 100 of an exemplary reformate exhaust burner module in accordance with the invention comprises an exhaust divider tube 102 mounted on an inner surface 104 of an engine exhaust pipe 106 of an internal combustion engine 109. The engine may be spark ignited or compression ignited. Tube longitudinal axis 108 is preferably parallel with exhaust pipe longitudinal axis 110. Tube 102 is open at both ends such that exhaust stream 112 passing through pipe 106, is free to pass either through or past tube 102. Tube 102 thus samples a percentage of the total exhaust flow proportional to the tube's percentage of the cross-sectional area of tube 102. It will be seen in the example shown in FIGS. 1 and 2 that tube 102 samples about 20% of the exhaust flow, creating a localized, dynamic flow region 114 within tube 102. Reformate supply pipe 116 for supplying reformate 118 from a catalytic hydrocarbon reformer source (not shown) to region 114 enters through the walls of pipe 106 and tube 102. An igniter 120, such as for example, a spark igniter or a glow plug, also enters region 114 for igniting a combustible mixture of reformate and oxygen derived from exhaust stream 112.

Alternatively, stream 118 indicated herein as reformate may comprise any other combustible gas, for example, hydrogen, from any source. Further, reformate 118 may be formed in known fashion by catalytic reforming of any suitable hydrocarbon fuel, for example, diesel fuel, jet fuel, or gasoline.

Temperature sensor 128, located in the combined exhaust stream near the exit of exhaust pipe 106 is used to determine whether downstream aftertreatment devices (not shown) are being adequately heated. Additional temperature sensors may be located in the exhaust stream near the entrance to exhaust pipe 106 (sensor 122); within exhaust divider tube 102 (sensor 124); and adjacent the exit of exhaust divider tube 102 (sensor 126). Other sensors may be used as well, for example, an oxygen sensor 121 at the entrance to burner 100 to measure percent oxygen in exhaust stream 112. Reformate flow, ignition of the mixture, oxygen percentage of the exhaust stream, and the various temperatures are all controlled and/or monitored in known fashion by an engine control module (ECM) 130 (shown schematically in FIG. 1).

Burner module 100 preferably includes end flanges 132, 134 for coupling the module into an engine exhaust system.

In operation, when ECM 130 determines additional heat is necessary for proper operation of the aftertreatment devices, a metered flow of reformate 118 is supplied via tube 116 to flow region 114 in exhaust divider tube 102 wherein the reformate mixes with exhaust stream 112 flowing through the region. Preferably, initial reformate flow is sufficient only to form a combustible mixture in region 114, which is then ignited by igniter 120. Burning reformate flows out of the downstream end of exhaust divider tube 102 and mixes with the balance of exhaust stream 112, the mixture then passing out of burner module 100. The temperature of the mixture is sensed by sensor 128, as well as any other downstream sensors, from which ECM 130 determines whether to a) maintain reformate flow, b) increase reformate flow, or c) terminate reformate flow.

Exemplary dimensions for a burner module 100 for a truck engine may be as follows: overall length (136), 14.25"; length (138) of exhaust divider tube, 3"; distance (140) from module entrance to exhaust divider tube, 3"; and distance (146) of sensor 128 from entrance of exhaust divider tube, 9.0". Exemplary dimensions for the other optional sensors may be distance (142) of sensor (124) from entrance of exhaust divider tube, 1.5"; and distance (144) of sensor 126 from entrance of exhaust divider tube, 4.5".

Figure 3:
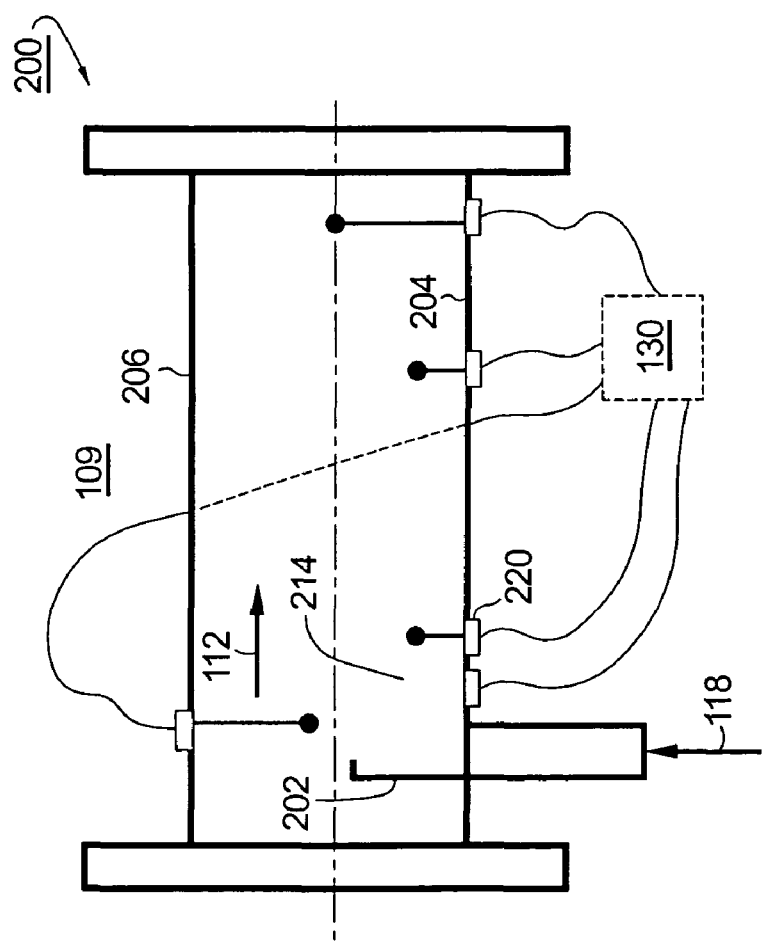
FIG. 3 is an elevational cross-sectional view of a second embodiment of a reformate exhaust burner module in accordance with the invention.

Referring now to FIGS. 3 and 4, a second embodiment 200 of an exemplary reformate exhaust burner module in accordance with the invention is similar to first embodiment 100 but simpler in construction. A localized ignitable mixture can be created by introducing a disruption in the exhaust flow 112 by a body protruding from an inner surface sidewall 204 of exhaust pipe 206, for example, a simple weir 202 partially occluding the flow of exhaust. Bernoulli flow past the weir creates an eddy region 214 of low pressure downstream of the weir wherein reformate 118 may be injected, mixed with oxygen in the exhaust gas, and ignited by igniter 220. A drawback of embodiment 200 is that turbulence and flow conditions in eddy region 214 will vary with total exhaust gas flow rate and therefore are not as well controlled as in embodiment 100, which is presently preferred.

It will be recognized that any body protruding from the wall of the exhaust pipe into the exhaust gas flow will create turbulence and a resulting eddy region immediately downstream; therefore, all such protrusions are fully comprehended by the invention, as exemplified by second embodiment 200.

Further, it will be recognized that burner modules in accordance with the present invention are not limited to use with diesel engines, but rather may be usefully employed where needed on all manner of compression-ignited and spark-ignited internal combustion engines.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A burner module for burning a combustible gas in an exhaust stream of an internal combustion engine, comprising:
   a) an exhaust pipe for carrying said exhaust stream;
   b) an exhaust divider tube attached to an inner wall of said exhaust pipe for selecting a portion of said exhaust stream;
   c) a port for introducing a combustible gas into said divider tube to form a combustible mixture with said selected exhaust gas portion; and
   d) an igniter within said exhaust pipe for igniting said combustible mixture.

2. A burner module in accordance with claim 1 wherein said combustible gas is a reformed hydrocarbon.

3. A burner module in accordance with claim 2 wherein said hydrocarbon is selected from the group consisting of diesel fuel, jet fuel, and gasoline.

4. A burner module in accordance with claim 1 wherein said port for introducing is a tube extending through said exhaust pipe wall.

5. A burner module in accordance with claim 1 wherein said igniter is a spark igniter.

6. A burner module in accordance with claim 1 wherein said igniter is a glow plug.

7. A burner module in accordance with claim 1 wherein said igniter is disposed within said exhaust divider tube.

8. A burner module in accordance with claim 1 further comprising at least one temperature sensor disposed within said exhaust pipe.

9. A burner module in accordance with claim 1 further comprising an oxygen sensor for determining oxygen percent in said exhaust gas stream.

10. A burner module in accordance with claim 1 further comprising a controller for controlling the flow of said combustible gas into said exhaust divider tube and for monitoring and controlling the thermal output of said burner module.

11. A burner module in accordance with claim 1 wherein said engine is selected from the group consisting of compression-ignited and spark-ignited.

12. A burner module for burning a combustible gas in an exhaust stream of an internal combustion engine, comprising:
  a) an exhaust pipe for carrying said exhaust stream;
  b) a protrusion extending inward from an inner wall of said exhaust pipe for creating a localized region containing a selected portion of said exhaust gas stream in the lee of said protrusion;
  c) a port for introducing a combustible gas into said localized region to form a combustible mixture with said selected exhaust portion; and
  d) an igniter within said exhaust pipe for igniting said combustible mixture.

13. A burner module in accordance with claim 12 wherein said protrusion is a weir in partial occlusion of said exhaust pipe.

14. A method for burning a combustible gas in an exhaust stream of an internal combustion engine, comprising the steps of:
  a) dividing said exhaust stream into a selected portion and a non-selected portion;
  b) introducing said combustible gas into said selected portion at a first gas flow rate to form a combustible mixture with said selected portion;
  c) providing an igniter;
  d) igniting said combustible mixture using said igniter; and
  e) combining said ignited combustible mixture with said non-selected portion.

15. A method in accordance with claim 14 comprising the further step of increasing said gas flow rate to a second gas flow rate for causing subsequent formation of a combustible mixture with said non-selected portion of said exhaust gas.

16. A method in accordance with claim 15 wherein said second flow rate provides said combustible gas to said non-selected portion in amounts stoichiometric with oxygen levels in said non-selected portion.

17. A method in accordance with claim 16 wherein said selected portion is smaller than said non-selected portion.

18. An internal combustion engine having at least one exhaust aftertreatment device requiring supplemental heating of the exhaust stream, the engine comprising a burner module for burning a combustible gas in said exhaust stream,
  wherein said burner module includes an exhaust pipe for carrying said exhaust stream, an exhaust divider tube attached to an inner wall of said exhaust pipe for dividing said exhaust stream into a selected portion and a non-selected portion, a port for introducing said combustible gas into said divider tube to form a combustible mixture with said selected exhaust gas portion therein, an igniter within said exhaust pipe for igniting said combustible mixture, wherein said ignited combustible mixture is combined with said non-selected portion of said exhaust gas stream to provide said supplemental heating to said aftertreatment devices.

\* \* \* \* \*